Aug. 2, 1955  H. C. PEARSON  2,714,407
DROP SAW LUMBER TRIMMING MACHINE
Filed Dec. 26, 1951  4 Sheets-Sheet 1

INVENTOR.
HARRY C. PEARSON
BY
Buckhorn and Cheatham
ATTORNEYS

Aug. 2, 1955          H. C. PEARSON          2,714,407
DROP SAW LUMBER TRIMMING MACHINE
Filed Dec. 26, 1951          4 Sheets-Sheet 2
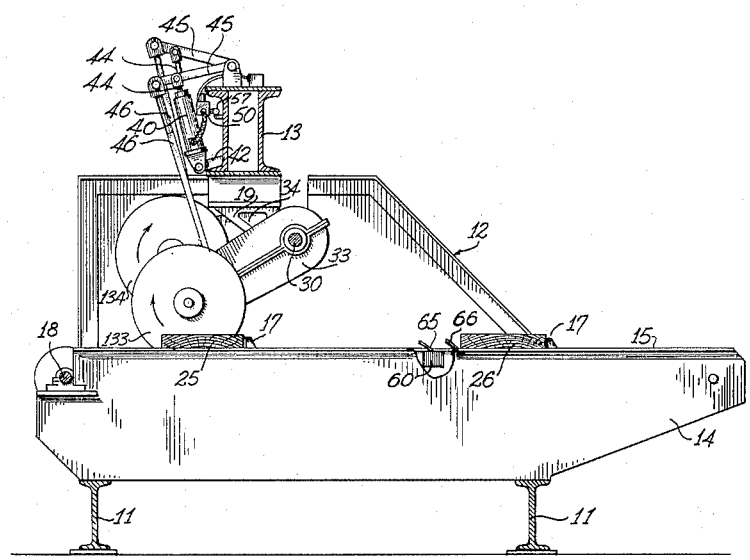
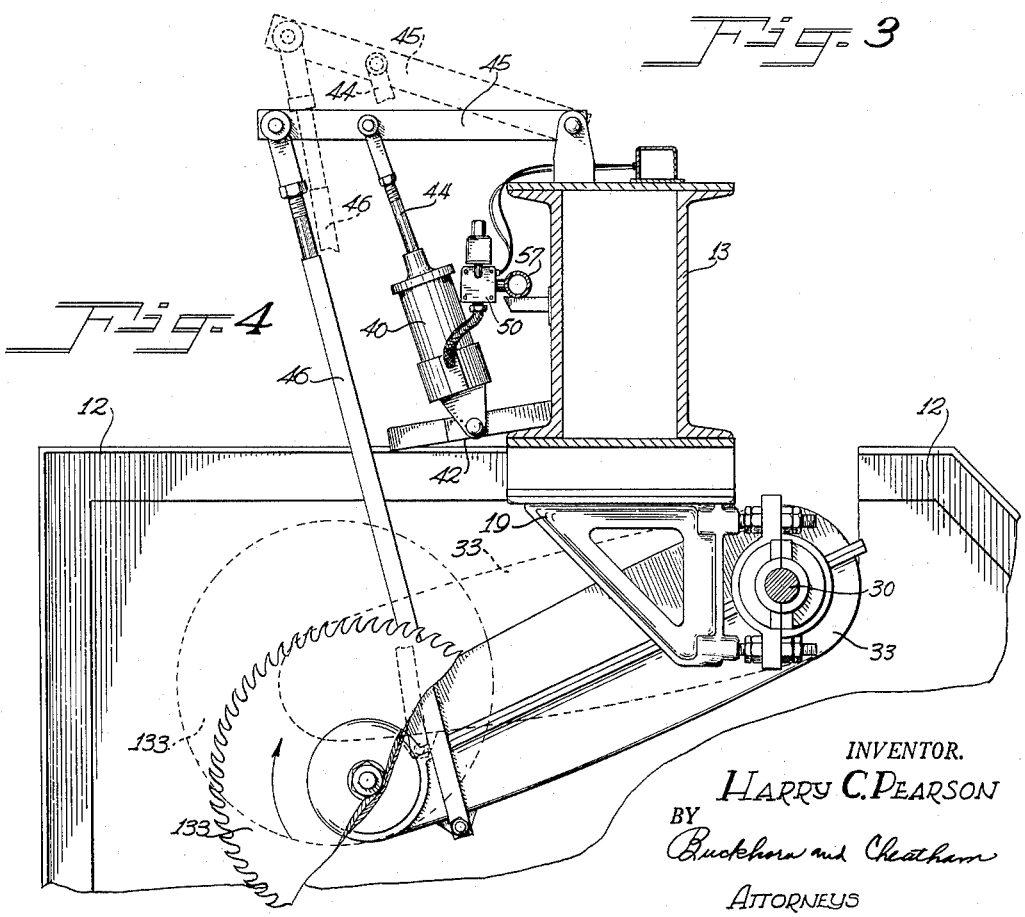
INVENTOR.
HARRY C. PEARSON
BY Buckhorn and Cheatham
ATTORNEYS

HARRY C PEARSON
INVENTOR.

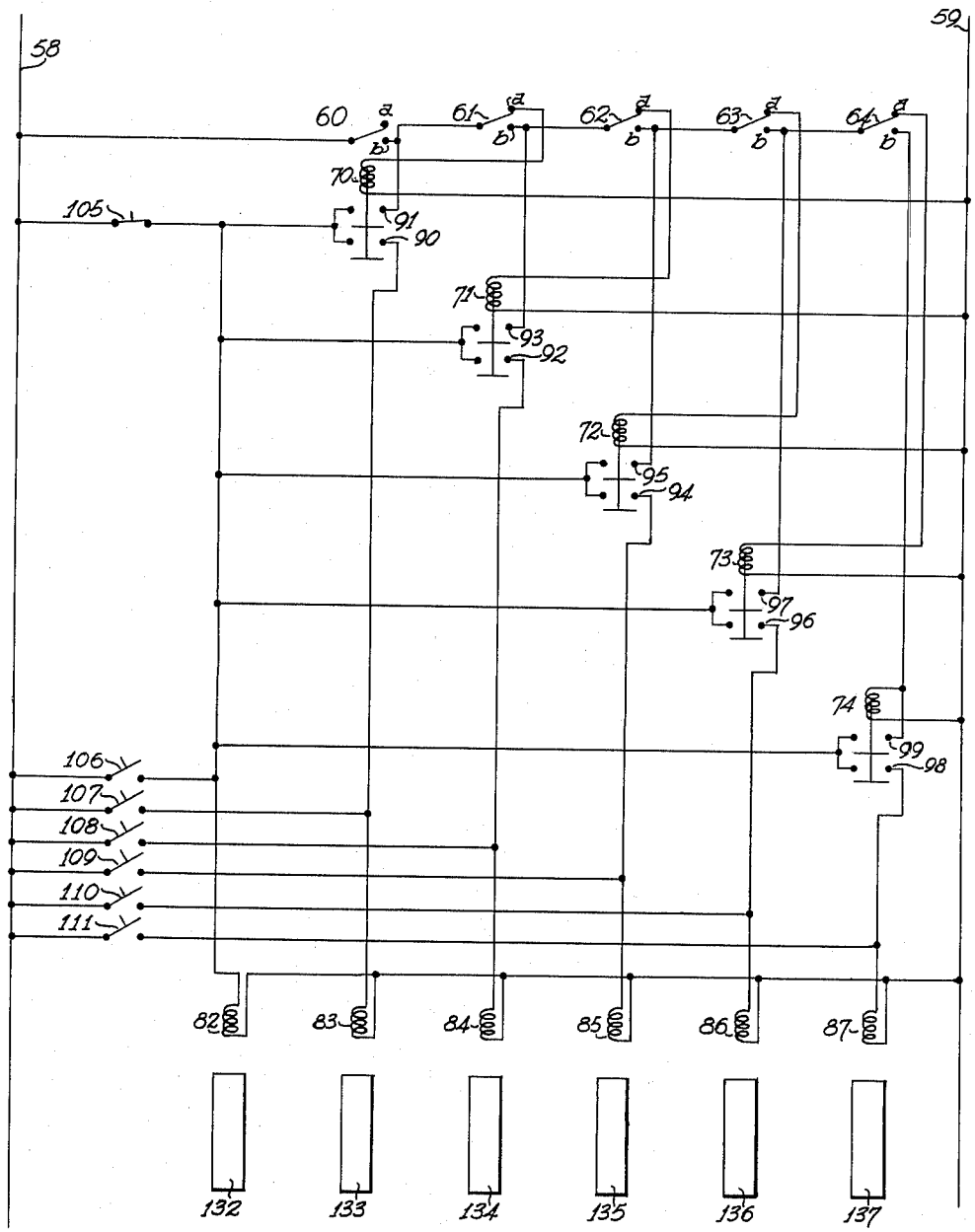

United States Patent Office 2,714,407
Patented Aug. 2, 1955

2,714,407

DROP SAW LUMBER TRIMMING MACHINE

Harry C. Pearson, Portland, Oreg., assignor to Portland Iron Works, Portland, Oreg., a corporation of Oregon Application December 26, 1951, Serial No. 263,381

13 Claims. (Cl. 143—41)

The present invention relates to a lumber trimming machine and more particularly to a new and improved automatically operating machine for trimming boards to desired lengths.

The lumber market today is increasingly demanding lumber trimmed accurately and squarely to specified lengths, and premium prices are frequently offered for lumber cut within a certain tolerance. It is advantageous, then, for a lumber mill to be equipped to trim lumber to qualify for this favorable market.

Lumber trimming machines have been employed for a considerable period. However, those of the past have been open to objection for such reasons as requiring an undue amount of manual attention or having a tendency to malfunction.

It is, then, an object of the present invention to provide a new and improved automatic lumber trimmer adapted for accurately trimming lumber to predetermined lengths.

It is another object of this invention to provide an improved electrical system for automatically controlling the operations of a lumber trimming machine.

It is a further object of the present invention to provide a new and improved automatic lumber trimmer which will automatically trim a piece of lumber passing therethrough to the longest predetermined length existent in said piece.

It is a still further object of this invention to provide a new and improved lumber trimmer that requires a minimum of manual attention.

It is another object of this invention to provide a new and improved lumber trimmer designed for a minimum of wear upon its attendant mechanical parts.

The foregoing and other objects and advantages of the present invention will be more readily ascertained from inspection of the following specification taken in connection with the accompanying drawing wherein like numerals refer to like parts throughout, while the features of novelty will be more distinctly pointed out in the appended claims.

In accordance with the illustrated embodiment thereof, the present invention comprises a lumber trimming machine including a frame structure having a horizontal bed with means to carry boards through the machine, a plurality of spaced-apart saws adapted selectively to be moved in and out of the path of boards passing through the machine, and means arranged on the bed to detect advancing boards and operate a circuit to actuate selectively mechanism provided for moving the saws.

In the drawing, Fig. 1 is a plan view of the lumber trimming machine embodying the present invention;

Fig. 3 is a view taken along line 3—3 of Fig. 1;

Fig. 4 is an enlarged view of a portion of Fig. 3;

Fig. 6 is a schematic circuit diagram illustrating the control circuit utilized in the present invention.

Figures 1, 2:
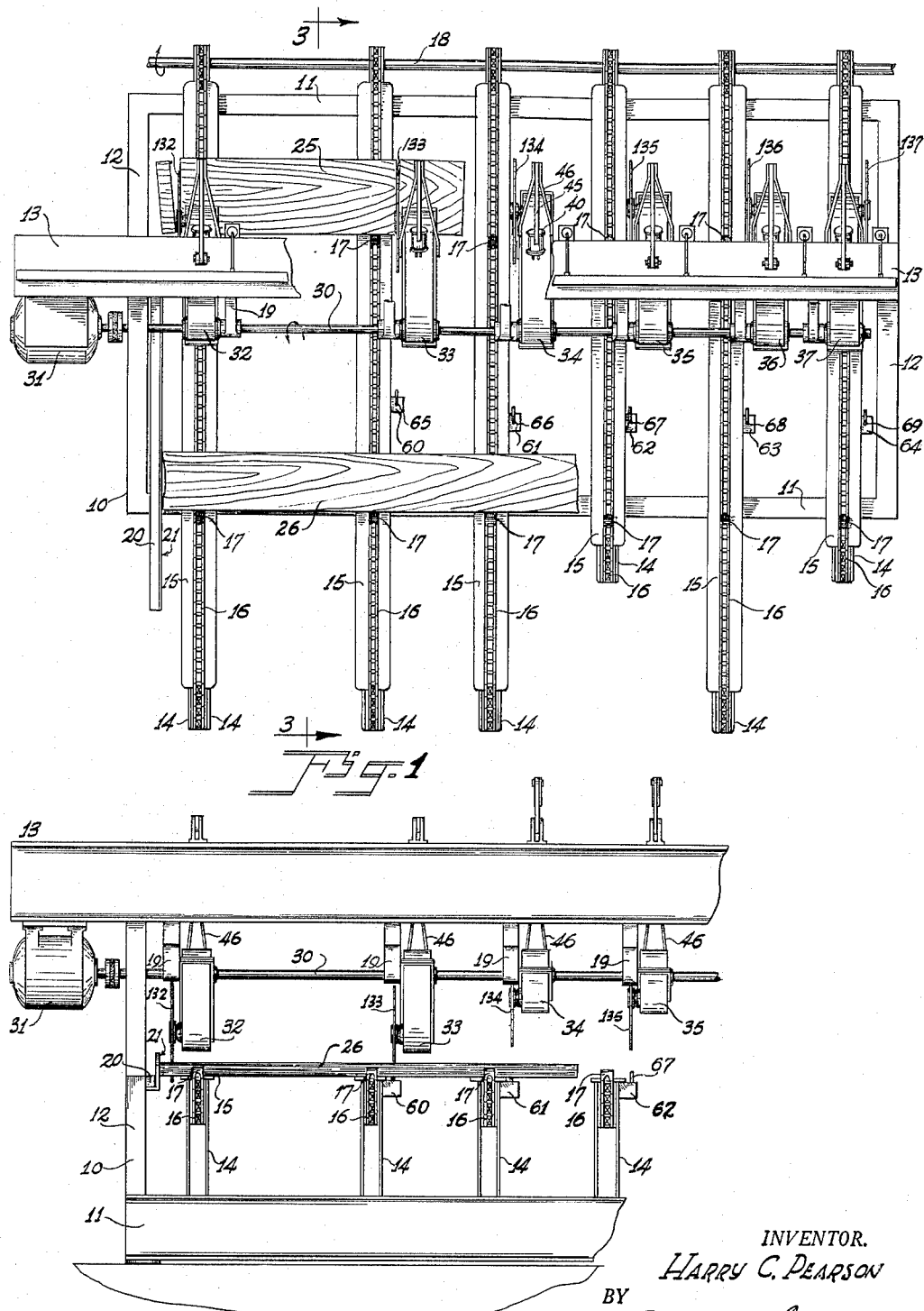
Fig. 2 is a front elevation of a portion of the lumber trimming machine.

It should be understood that the lumber trimmer of the present invention, as is ordinarily the case, is adapted for trimming lumber which has previously been passed through edging operations whereby the lumber comes to the trimmer with the longitudinal edges of the board straight and parallel.

Referring now to the drawing, there is shown therein a lumber trimming machine 10 including a frame having a pair of base members 11 and a pair of end plates 12 which support a beam 13. Supported at spaced-apart intervals on the base members 11 are chain races 14, each of which is provided with flanges 15 extending horizontally from each side of the top edge thereof, the flanges of all the chain races lying in the same plane. Carried by the chain races 14 are chains 16, each of the chains having a number of evenly spaced pusher blocks 17 carried thereby and adapted to extend above the plane of the bed formed by the flanges. The pusher blocks on each of the chains are spaced apart the same distance and are arranged in rows normal to the direction of movement of the chains, the chains being driven from a head shaft 18 (by means not shown) at the same speed whereby the pusher blocks on the respective chains advance toward the saws in rows normal to the direction of movement of the chains. To position the lumber as it is fed onto the bed, a guide plate 20 having a perpendicular surface 21 parallel to the line of movement of the chain is provided at one edge of the bed.

In the operation of the trimmer, a single individual board is fed onto the bed between each of the rows of pusher blocks 17 with one end of the board abutting the surface 21 of the guide plate 20. The pusher blocks engage the trailing edge of the board and advance it through the machine with its leading edge at right angles to the direction of movement of the board, as best shown by the position of boards 25 and 26 in Figs. 1 and 3. It may be seen, therefore, that the present machine includes a bed having means for horizontally transporting boards therethrough in a parallel, spaced-apart relation and in a direction at right angles to the longitudinal direction of the boards.

It is not necessary that each chain race extend outwardly the same distance at the feed end of the trimmer, especially at the side of the machine used only with the longest length of boards, this being the right side in the general case as illustrated. Thus, as shown, the first and third chain races from the right side of the machine do not extend forwardly as far as the remaining chain races, the others being sufficient to support the boards during their initial movement toward the saws. It should be noted, however, that each of the circular saws has a chain race positioned closely adjacent thereto. Further discussion of this point will be made as the description proceeds.

Arranged transversely and above the bed is an arbor 30 supported by the end plates 12 and arbor support members 19 connected to the beam 13, the arbor being suitably journaled at the supporting points so that it may be driven by a motor 31. Pivotally mounted on the arbor 30 at spaced-apart intervals are bracket members 32, 33, 34, 35, 36 and 37. As shown, each of the brackets is mounted at one end thereof on the arbor 30 and carries on its other end a rotatably mounted circular saw, brackets 32 to 37 inclusive carrying saws 132 to 137 inclusive, respectively. The saws are driven from the arbor 30 through a conventional driving mechanism enclosed in the brackets and not shown in the drawing. The bracket 32 is arranged on the arbor 30 whereby saw 132 is in close proximity to the guide plate 20 so as to trim lumber closely adjacent the end thereof abutting the plate 20, the remaining brackets being spaced whereby the respective saws are successively spaced at predetermined distances from the plane of the saw 132. The saw 132 functions, therefore, as a base saw and as a base point from which the remaining saws are spaced at progressively greater distances. In the preferred arrangement of the trimmer, as shown in Figs. 1 and 2, the chain races 14 are spaced so that an individual one is closely adjacent the cutting plane of each saw, whereby a board being cut by a particular saw is firmly supported during the cutting operation. In the illustrated embodiment the saws 132 and 133 are shown in their operative position; that is, in the position wherein they intercept the plane of movement of boards passing through the trimming machine whereby they will cut any board passing through the trimmer that intercepts the planes of the saws. The remaining saws are shown in their inoperative positions; that is, wherein they are held above the plane of movement of boards passing through the machine.

Figure 5:
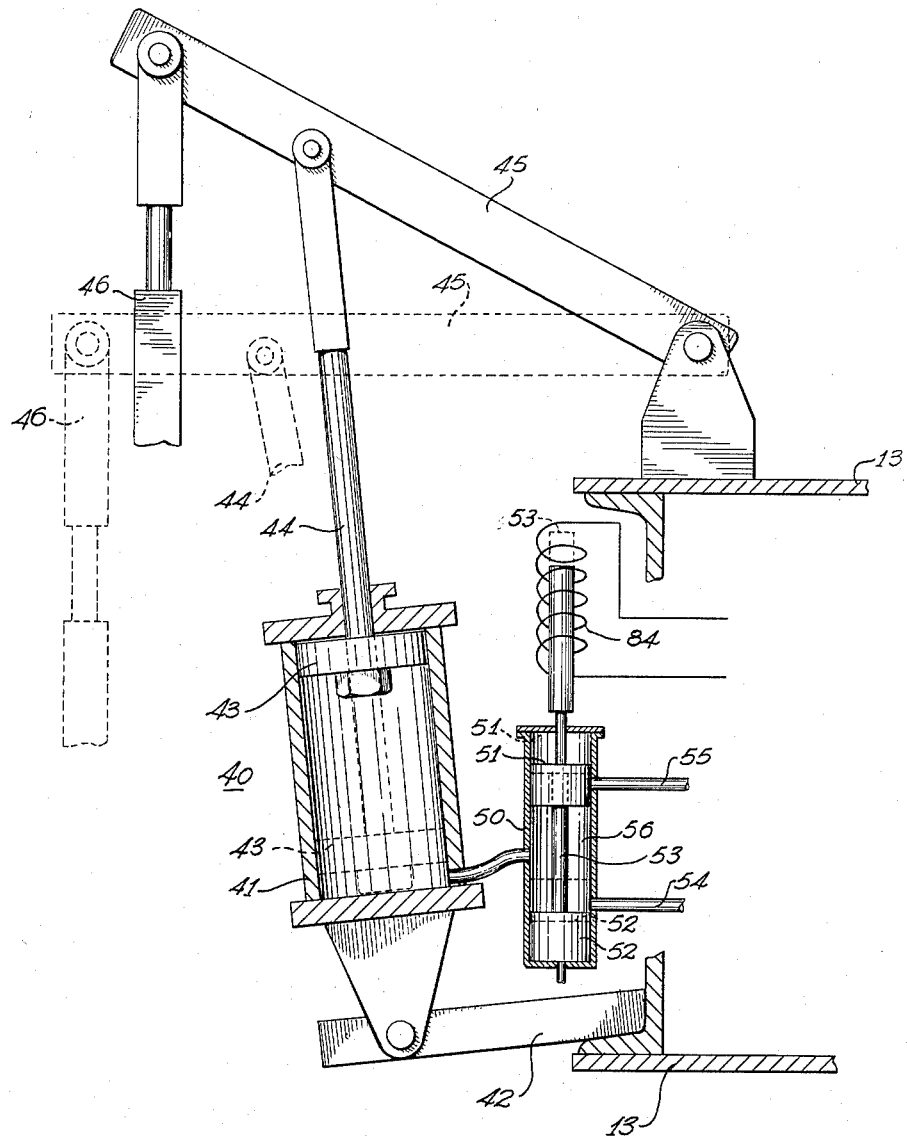
Fig. 5 is a view partially in cross-section of the mechanism for moving the saws in and out of the path of travel of boards through the machine, the control valve and its actuating solenoid being shown schematically for purposes of greater clarity.

The saws are moved to and from their operative positions by individual actuating means operatively connected to each of the brackets. As shown in Figs. 3, 4, and 5 this actuating mechanism includes a hydraulic operating motor 40 having a cylinder 41 pivotally supported by a support member 42 affixed to the beam 13. The piston 43 of the motor is connected through a piston rod 44 to the fulcrum lever 45 pivotally mounted at one end thereof to the beam 13. The other end of the fulcrum lever 45 is secured to a saw supporting bracket, such as the bracket 33, by means of a bail 46.

Control means for the motors is shown in the present instance as an ordinary pilot valve 50 comprising a casing 56 and a pair of spaced-apart valve heads 51 and 52 arranged upon a stem 53. The valve heads 51 and 52 and the stem 53 are biased by gravity or other suitable means so that the valve heads are positioned to normally admit actuating fluid such as air to the motor from a suitable source 57 through a port 54, an exhaust port 55 venting to atmosphere normally being closed. Valve actuating means such as a solenoid 84 is connected to the stem 53 and, when energized by means hereinafter described, raises the pistons 51 and 52 so as to close the port 54 and open port 55 whereby the fluid in the cylinder 41 may vent to atmosphere. In Fig. 4 the normal position of the actuating mechanism is shown in solid lines. As evident, in this position the saw controlled by the actuating mechanism will be in its inoperative position. The dotted lines of Fig. 4 indicate the position of the elements of the actuating mechanism when the solenoid 84 is actuated, in which case, as will also be evident, the saw will be lowered.

Control of the operations of the trimmer of the present invention is attained through the simple and unique circuit diagrammatically illustrated in Fig. 6. The objective of the circuit is selectively to energize the solenoids 82, 83, 84, 85, 86 and 87 associated respectively with saws 132, 133, 134, 135, 136 and 137. Means are provided for detecting the advance of a board through the machine and operating the circuit, including double throw switches 60, 61, 62, 63 and 64 mounted on the chain races 14 just ahead of saws 133, 134, 135, 136 and 137, respectively. Each of the switches is provided with an operating element or tripping arm aligned with the plane of the trimming saw with which the switch is associated and positioned to be engaged by a board and change the position of its switch when a board passes through the machine intercepting the cutting plane of the associated saw. Shown in Fig. 1 are tripping arms 65, 66, 67, 68 and 69 for switches 60, 61, 62, 63 and 64, respectively. Switches 61 through 64 inclusive are arranged in a line normal to the cutting plane of the saws, whereas switch 60 is preferably mounted somewhat closer to saw 133 than this line whereby the tripping arm 65 of switch 60 will be engaged by an advancing board after the tripping arms of any of the remaining switches. The purpose of this alignment will be further explained as the description proceeds.

Means responsive to the detection operation of the switches for selectively energizing certain of the saw actuating motors are afforded by the circuit illustrated in Fig. 6. The circuit also includes means effective to energize certain of the actuating means whereby any saws in an operative position between the base saw and the saw most remote from the base saw whose cutting plane is intercepted by a board are moved to an inoperative position. Further means are provided effective to energize the actuating means associated with said most remote saw whereby that saw is moved to its operative position. Provision is also made for holding a saw in an operative position when once moved thereto until a board is detected advancing through the machine, which will intercept the saw next furthest from the base saw. Referring now to Fig. 6, lines 58 and 59 represent a suitable source of power across which the various elements of the circuit are connected. The switches 60, 61, 62, 63 and 64 are biased to their normal or first contact engaging positions "a," each having a second contact engaging position "b" to which it is moved when its operating lever is engaged by a board moving toward the saws. The second contact "b" of each of the switches 60, 61, 62 and 63 is connected by a line to the movable contacting element of the next successive switch. The first contact "a" of each of the switches following the first switch 60 is connected to the control means for the saw aligned with the next preceding switch. Thus the normal contact "a" of each of the switches 61, 62, 63 and 64 is connected to the windings of relays 70, 71, 72 and 73, respectively, each relay having a pair of normally open contacts. Connected to contact "b" of switch 64 is relay 74, also having a pair of normally open contacts. As shown, the contact 90 of relay 70 acts as a circuit control element for a circuit including the winding of solenoid 83, while contact 91 of relay 70 serves to establish a holding circuit for the relay 70, this latter circuit being more fully explained hereinafter. Likewise, relay 71 has a contact 92 in the control circuit for the solenoid winding 84 and a contact 93 for a holding circuit including relay 71; relay 72 has a contact 94 for winding 85 and a contact 95 for a holding circuit including relay 72; relay 73 has a contact 96 for winding 86 and a contact 97 for a holding circuit including relay 73; and relay 74 controls solenoid 87 through contact 98 and has a holding circuit established through contact 99. For convenience in following the operation of the circuit, blocks representing a particular saw have been placed below the circuit diagram with the elements of the circuit related to the particular saw aligned above the respective block.

Describing the operation of the control circuit, assume that a board, such as board 25 of Fig. 1, passes through the trimmer with one end thereof abutting the surface 21 of the guide plate 20 and the other end extending past the plane of the saw 133 but not sufficiently far to intercept the plane of the saw 134. As the board 25 advanced it intercepted and tripped the switch 60 from its position "a," its open position, to position "b," its closed position. Switch 61 and the remaining switches, however, were not tripped; thus, the closing of switch 60 established a circuit through contact "a" of switch 61 and relay 70. When relay 70 was energized, contacts 90 and 91 were closed, and one consequence thereof was the closing of the circuit including the solenoid 83. In the manner previously explained, the energization of this solenoid resulted in the activation of the pilot valve associated with the saw 133 whereby the fluid to the servomotor was cut off and the saw 133 was lowered into the path of movement of the board 25 through the machine. Thus, as shown in Fig. 1, board 25 is being trimmed by saw 133 as it advances through the plane of the saw. A further consequence of the energization of relay 70 was the closing of contact 91 establishing a holding circuit for relay 70 through the contact "a" of the switch 61 and the winding of relay 70 to the other side of the source of supply whereby the relay 70 continues to remain energized even though switch 60 is once again opened. This holding circuit has two functions: one is to hold the saw 133 down until the board 25 has advanced past the saw; the other is to serve as means to hold the saw 133 in its cutting position until a board sufficiently long to intercept switch 61 advances through the machine, in which case the holding circuit is broken. This second function serves to reduce the wear on a machine since unnecessary up-and-down movement of the brackets is eliminated.

A certain spacing is necessary between the advancing boards to obtain successful operation of the machine. As may be perceived at this point, this spacing is such that a board, having tripped the switches, advances through the saws before the next advancing board trips the switches. This spacing is attained by mounting the pusher blocks 17 on the chains 16 at a sufficient distance apart commensurate with the width of the lumber being trimmed. The actual spacing of course depends upon the conditions of operation under which the machine is used.

With the circuit elements in their normal positions, in which case saws 133 through 137 inclusive will be in their inoperative positions, the sequence of operations will now be described when a longer board 26 passes through the machine, the board 26 extending, as shown in Fig. 1, from the surface 21 past the switch 61. In this case it is desired that the saw 133 remain withdrawn from its cutting position and that the saw 134 be lowered to trim the board 26. As stated previously, the switches 61, 62, 63 and 64 are preferably arranged to be engaged by the advancing edge of the board before the switch 60 is engaged. Thus, as the board 26 advances, the switch 61 will be moved from position "a" to position "b" thereof, and, subsequently, the switch 60 will be moved to its closed position at "b." The advantage of this switch arrangement can be herein shown since it is apparent that at no time during this operation will the circuit operating the valve control mechanism for the saw 133 be closed, inasmuch as the contact "a" of the switch 61, necessary for that circuit, is opened before the switch 60 is closed. However, it should be understood that it is not necessary to the successful operation of the trimmer that the switches be aligned in the preferred arrangement. Even if the switch 60 is aligned with the remaining switches, the correct position of the saws will ultimately and timely result; but, as may be surmised from examination of the circuit and the foregoing explanation of its operation, with the switch 60 aligned with the remainder of the switches, the relays will go through a "hunting" sequence before ultimately assuming the correct positions, and the extra wear thus imposed upon the relays is to be avoided, of course, if possible.

Proceeding now with the discussion of the operation of the circuit as board 26 advances, when the switches 60 and 61 are moved to their respective "b" contacts a circuit will be established through these switches and through contact "a" of the switch 62 and the winding of the relay 71, energizing this relay and causing contacts 92 and 93 to close. Closing of contact 92 will cause solenoid 84 to be energized, closing off the air supply to the servomotor supporting the bracket 34 whereby the saw 134 will lower and trim the board 26 as it advances. The closing of contact 93 establishes a holding circuit through contact "a" of switch 62 and relay 71 serving to keep relay 71 energized though both switches 60 and 61 return to their "a" positions. Since relay 71 remains energized, contact 92 will remain closed so that solenoid 84 will remain energized and saw 134 will remain down.

If, with the preceding condition still in effect, a next board advances through the machine not sufficiently long enough to trip the switch 61 but long enough to trip the switch 60, for example, a board of a length of the board 25, the saw 134 will remain down since there is no event which causes the switch 62 to break contact at "a" and open the holding circuit of relay 71. The saw 133, however, will be lowered to trim the board advancing therethrough as a result of the sequence of events described in the first illustration of the operation of the machine.

With this situation; that is, with both saws 133 and 134 lowered to their cutting positions, assume that a board advances through the machine at least long enough to intercept the plane of the saw 136 and trip the switch 63. As this board advances, it will trip the switches 61 and 62 from their contacts "a" before the switch 60 is closed. Thus, the relay holding circuits for both relays 70 and 71 will be broken, the solenoids 83 and 84 will be deenergized, and the saws 133 and 134 will be raised by actuation of the servomotor connected thereto. When the board advances sufficiently far to move each of the switches 60, 61, 62 and 63 to its "b" position, a circuit will be established through these switches and contact "a" of switch 64 to actuate relay 73, closing thereby contacts 96 and 97 of this relay. Solenoid 86 will be energized to cause saw 136 to lower, and a holding circuit for the relay will be established through the contact 97. Saw 136 will thus remain lowered until a board sufficiently long to intercept switch 64 aligned with saw 137 passes through the machine, in which event switch 64 will be tripped to open the holding circuit for saw 136 and saw 136 will be raised and saw 137 in the subsequent course of events will be lowered to trip the board. Saw 137, of course, will remain down when once lowered in the automatic phase of the operation of the trimmer.

It should be observed that in effect the circuit described and illustrated actually provides a means for sensing the maximum predetermined length existent in a board.

As may have been noted in the course of the preceding description, each of the circuits established by the contacts of the relays passes through a normally closed master control switch 105. Thus, when this switch is open, it is impossible to cause any of the saws to lower by operation of switches 60 through 64 inclusive, and, of course, any saws that were lowered while switch 105 was closed will automatically raise when it is opened, since all of the solenoids and relays will be deenergized. Switch 105, then, affords a degree of manual control over the saws and affords a means for terminating the automatic operation of the machine. Further manual control is provided by an individual, normally open, manually operated switch associated with each of the saws, there being shown in Fig. 6 switches 106, 107, 108, 109, 110 and 111 associated individually with solenoids 82 through 87, respectively. Closing of switch 107, for example, completes a circuit including the solenoid 83, causing the solenoid to be energized and saw 133 to be lowered. In the same manner, each of the remaining switches can be operated to lower its associated saw. It is to be understood that switch 105 will be open when manual control is to be taken over by switches 106 to 111.

Saw 132 is controlled through a servo system substantially identical to that used to actuate the other saws, the solenoid 82 shown in Fig. 6 being adapted to energize the valve control device of the motor associated with saw 132. Solenoid 82 is directly connected to switch 105 so that solenoid 82 is normally energized whereby saw 132 is retained in its lowered or operative position during the automatic operation of the trimmer. When switch 105 is opened, saw 132 is raised, of course, along with the remaining saws, but can be lowered again by closing switch 106, which is normally open, or closing switch 105 again.

This manual control system is provided since in some instances it is desired to pass the lumber through the machine without trimming it, and the trimmers are set up in the usual mill flow line so that it is difficult, if not impossible, to pass the lumber around the machine. Thus, if lumber is not to be dimensioned, manual switch 105 is opened so that all the saws are raised and the boards are conveyed through the machine without trimming them. Again, there may be a series of boards having large defects in portions thereof. In such a case, an operator can open switch 105 so that all the saws are raised, and close the manual switch or switches of the saws he wishes to lower to cut the defective portions from the boards.

There has been illustrated a trimmer having a base saw and five trimming saws. It should be understood, however, that the present invention is applicable to trimmers employing more or fewer saws. Also, the actual spacing between the saws can be varied to meet the requirements of the operation and is not limiting on the present invention.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A machine for trimming lumber of random lengths to predetermined lengths, comprising a frame including a bed having means for horizontally transporting boards through the machine parallel to each other in a direction at right angles to their direction of movement, a plurality of adjustably mounted circular saws having operative and inoperative positions supported from said frame whereby the cutting plane of each saw is parallel to the cutting plane of every other saw and perpendicular to the direction of movement of said boards, one of said saws being arranged as a base saw at one edge of said bed, the remaining saws of said plurality of saws being spaced at distances corresponding to said predetermined lengths from said base saw, means for driving said saws, actuating means operatively connected to each of said saws for independently moving the associated saw from one of said positions to the other, automatic means for controlling the movement of said actuating means, said automatic means including means positioned forwardly of said saws for detecting the advance of a board through the machine, energizing means responsive to detection operation of said last-mentioned means for energizing certain of said actuating means whereby said saws in an operative position between said base saw and the saw most remote from said base saw whose cutting plane is intercepted by said board are moved to an inoperative position, said energizing means further responsive to said detection operation to energize the actuating means associated with said most remote saw to move said most remote saw to an operative position if not already in operative position, and means responsive to said detecting means to retain said most remote saw in an operative position until a board is detected advanced through the machine which will intercept the saw next farthest from said base saw.

2. A machine for trimming lumber of random lengths to one of a number of predetermined lengths, comprising a frame including a bed having means for horizontally transporting boards through the machine parallel to each other in a direction at right angles to their direction of movement through the machine, a plurality of adjustably mounted circular saws having operative and inoperative positions mounted on said frame whereby the cutting plane of each saw is parallel to the cutting plane of every other saw and perpendicular to the direction of movement of said boards, one of said saws being arranged as a base saw at one edge of said bed, the remaining saws of said plurality of saws being spaced at distances corresponding to said predetermined lengths from said base saw, means for driving said saws, an actuating means operatively connected to each of said saws for independently moving each of said saws from one of said positions to the other, automatic means connected to said actuating means for controlling the movement thereof, said automatic means including a plurality of individual switch means positioned forwardly of said saw, one of said switch means being aligned with the cutting plane of each of said saws and arranged to be actuated by a board advancing through said machine and intercepting the cutting plane of the associated saw, energizing means operatively connected to each of said switch means and responsive to operation of the corresponding switch means for energizing the corresponding actuating means connected thereto whereby any saws in an operative position between said base saw and the saw most remote from said base saw whose cutting plane is intercepted by said board are moved to an inoperative position, said energizing means further responsive to said switch means upon actuation thereof to energize the actuating means associated with said most remote saw to move said most remote saw to an operative position if not already in operative position, and means responsive to said switch means to retain said most remote saw in an operative position until a board passing through the machine intercepts the switch associated with the saw next farther than said remote saw from said base saw.

3. A machine for trimming lumber of random lengths to one of a number of predetermined lengths, comprising a frame including a bed having means for horizontally transporting boards through the machine parallel to each other in a direction at right angles to their direction of movement, an arbor supported on said frame, a plurality of bracket members pivotally mounted at one end thereof on said arbor at spaced-apart intervals, a plurality of circular saws, one of said saws mounted on each of said bracket members at the other end thereof whereby the cutting plane of each saw is parallel to the cutting plane of every other saw and perpendicular to the direction of movement of said boards, means for driving said saws, one of said saws being arranged as a base saw at one edge of said bed, the remaining saws of said plurality of saws being spaced at distances corresponding to said predetermined lengths from said base saw, actuating means mounted on said frame and operatively connected to each of said bracket members for moving said saws in and out of the plane of movement of said boards, automatic means for controlling the movement of said actuating means, said automatic means including individual switch means aligned one with each saw in the cutting plane thereof and positioned forwardly of the associated saw and arranged to be engaged by a board advancing through said machine intercepting the cutting plane of the associated saw, means responsive to said engaged switch means for energizing said actuating means whereby any saws in said plane of movement between said base saw and the saw most remote from said base saw whose cutting plane is intercepted by said board are moved out of said plane of movement, said energizing means further responsive to said engaged switch means to energize the actuating means associated with said most remote saw and move said most remote saw into said plane of movement if not already in such position, means responsive to said switch means to retain said most remote saw in said plane of movement until a board passing through the machine intercepts the switch associated with the saw next farther from said base saw, manual control means for rendering ineffective said automatic control means, and manually operated means for controlling said actuating means.

4. A machine for trimming lumber of random lengths to one of a number of predetermined lengths, comprising a frame including a bed having means for horizontally transporting boards through the machine parallel to each other in a direction at right angles to their direction of movement, a guide plate arranged adjacent an edge of said bed, said boards being arranged on said bed with one end abutting said guide plate, an arbor supported on said frame, a plurality of bracket members pivotally mounted at one end thereof on said arbor at spaced-apart intervals, a circular saw mounted on each of said bracket members at the other end thereof whereby the cutting plane of each saw is parallel to the cutting plane of each and every other saw and perpendicular to the direction of movement of said boards, one of said saws being arranged as a base saw in close proximity to said guide plate, the remaining saws of said plurality of saws being spaced at distances corresponding to said predetermined lengths from said base saw, means for driving said circular saws, a plurality of servomotors mounted on said frame, an individual servomotor operatively connected to each of said bracket members for moving said saws and positioned forwardly of the associated saw in and out of the plane of movement of said boards, automatic means for controlling said servomotors, said automatic means including individual switch means aligned one in the cutting plane of each of said saws and positioned forwardly of the associated saw and arranged to be engaged by a board advancing through said machine intercepting the cutting plane of the associated saw, means responsive to said switch means for actuating said servomotors whereby any saws in said plane of movement between said base saw and the saw most remote from said base saw whose cutting plane is intercepted by said board are moved out of said plane of movement and said servomotor associated with said most remote saw is actuated to move said most remote saw into said plane of movement if not already in such position, means responsive to said switch means to retain a saw in said plane of movement until a board passing through the machine intercepts the switch associated with the saw next farther from the base saw, manually operated control means for rendering ineffective said automatic control means, and manually operated means for actuating said servomotors.

5. In a lumber trimming machine adapted for trimming lumber of random lengths to predetermined maximum lengths having a base saw and a plurality of adjustably mounted driven saws having operative and inoperative positions spaced at said predetermined lengths from said base saw, means for advancing individual pieces of lumber in a parallel, spaced-apart relation in a horizontal plane and in a direction at right angles to the longitudinal direction of the lumber and with said pieces being positioned to be trimmed closely adjacent one end thereof by said base saw, and individual actuating means operatively connected to each of said plurality of saws for independently moving the associated saw from one of said positions to the other; the invention comprising means for sensing the length of said individual pieces as they advance toward said saws, and means responsive to said sensing means for energizing certain of said actuating means whereby any saws in an operative position between said base saw and the saw most remote from said base saw intercepted by an advancing piece will be moved to an inoperative position and said most remote saw will be moved to an operative position if not already in such position.

6. In a lumber trimming machine adapted for trimming lumber of random lengths to predetermined maximum lengths having a base saw, a plurality of adjustably mounted driven saws having operative and inoperative positions spaced at said predetermined lengths from said base saw, means for advancing individual pieces of lumber in a parallel, spaced-apart relation in a horizontal plane and in a direction at right angles to the longitudinal direction of the lumber and with said pieces being positioned to be trimmed closely adjacent one end thereof by said base saw, and individual actuating motor means operatively connected to each of said plurality of saws for independently moving the associated saw from one of said positions to the other; the invention comprising switch means arranged immediately before each saw for sensing the advance of a board toward a saw, and electrical control means responsive to said switch means for energizing certain of said actuating means whereby any saws in an operative position between said base saw and the saw most remote from said base saw intercepted by said advancing board will be moved to an inoperative position if not already in such position.

7. In a lumber trimming machine adapted for trimming lumber of random lengths to predetermined lengths having a base saw, a plurality of adjustably mounted driven saws having operative and inoperative positions spaced at said predetermined lengths from said base saw, means for advancing individual pieces of lumber in a parallel, spaced-apart relation in a horizontal plane and in a direction at right angles to the longitudinal direction of the lumber, and with said pieces positioned to be trimmed closely adjacent one end thereof by said base saw, and individual actuating means operatively connected to each of said plurality of saws for independently moving the associated saw from one of said positions to the other of said positions; the invention comprising means for detecting the maximum of said predetermined lengths existent in an advancing piece of lumber, means responsive to said detecting means for energizing said actuating means whereby only the saw of said plurality of saws at the predetermined length next shorter than the length of said advancing piece will be moved to said operative position if not already in such position to cut said board, and means for holding a saw moved to an operative position in such position until a piece of lumber longer than from the base saw to the saw next farther from the base saw intercepts said detecting means.

8. In a lumber trimming machine adapted for trimming lumber of random lengths to predetermined lengths having a base saw, a plurality of adjustably mounted driven saws having operative and inoperative positions spaced at said predetermined lengths from said base saw, means for advancing individual pieces of lumber in a parallel, spaced-apart relation in a horizontal plane and in a direction at right angles to the longitudinal direction of the lumber and with said pieces positioned to be trimmed closely adjacent one end thereof by said base saw, and individual actuating means operatively connected to each of said plurality of saws for independently moving the associated saw from one of said positions to the other of said positions; the invention comprising individual switch means arranged immediately one before each of said plurality of saws for detecting the advance of a piece of lumber toward a saw, means responsive to said switch means for energizing said actuating means whereby only the saw of said plurality of saws at the predetermined length next shortest the length of said advancing piece will be moved to said operative position if not already in such position to cut said piece, and means for holding a saw moved to an operative position in such position until a piece of lumber longer than from the base saw to the saw next farther from the base saw intercepts said switch means.

9. In a lumber trimming machine adapted for trimming lumber of random lengths to predetermined lengths having a base saw, a plurality of adjustably mounted driven saws having operative and inoperative positions spaced at said predetermined lengths from said base saw, means for advancing individual pieces of lumber in a parallel, spaced-apart relation in a horizontal plane and in a direction at right angles to the longitudinal direction of the lumber, and with said pieces positioned to be trimmed closely adjacent one end thereof by said base saw, and individual actuating means operatively connected to each of said plurality of saws for independently moving the associated saw from one of said positions to the other of said positions; the invention comprising individual switch means having a projecting lever arranged immediately before each saw and positioned whereby a board advancing in the line of a saw will trip said switch, means responsive to said switch means for energizing said actuating means whereby only the saw of said plurality of saws at the predetermined length next shortest the length of said advancing piece will be moved to said operative position if not already in such position to cut said board, and means for holding a saw moved to an operative position in such position until a piece of lumber longer than from the base saw to the saw next farther from the base saw intercepts said detecting means.

10. In an electrical control arrangement for a lumber trimming machine for trimming lumber of random lengths to predetermined lengths including a bed having means for advancing longitudinally of the bed individual pieces of lumber in a parallel, spaced-apart relation in a horizontal plane and in a direction at right angles to the longitudinal direction of the lumber, a plurality of parallel, successive, adjustably mounted driven saws aligned transversely of said bed and spaced at progressively greater predetermined distances from a base point at one edge of said bed, and individual actuating means including an electrical control means operatively connected to each of said plurality of saws for independently moving the associated saw from inoperative to operative position; the invention comprising a plurality of successive double throw switches including first and second contacts, each of said switches including an operating element arranged ahead of and aligned with a corresponding one of said successive saws, said operating element extending into the path of travel of said board and adapted to be engaged by the edges thereof for shifting said switches from a normal first contact engaging position to a second contact engaging position, the second contact of each switch being electrically connected to the contacting element of the next successive switch, the first contact of each switch following the first switch being electrically connected to the control means for the saw aligned with the next preceding switch, whereby the saw aligned with the switch element most remote from said base point engaged by a board is activated to operative position, and holding means on each of said electrical control means for retaining any saw so activated to operative position in such position until the switch operating element aligned with the next successive saw is engaged by a board, said holding means comprising an energizing circuit for each electrical control means including the first contact of the switch aligned with the next successive saw.

11. In an electrical control arrangement for a lumber trimming machine for trimming lumber of random lengths to predetermined lengths including a bed having means for advancing longitudinally of the bed individual pieces of lumber in a parallel, spaced-apart relation in a horizontal plane and in a direction at right angles to the longitudinal direction of the lumber, a plurality of parallel, successive, adjustably mounted driven saws aligned transversely of said bed and spaced at progressively greater predetermined distances from a base point at one edge of said bed, and individual actuating means including an electrical control means operatively connected to each of said plurality of saws for independently moving the associated saw from inoperative to operative position; the invention comprising a plurality of successive double throw switches including first and second contacts, each of said switches including an operating element arranged ahead of and aligned with a corresponding one of said successive saws, said operating elements extending into the path of travel of said board and adapted to be engaged by the edge thereof for shifting said switches from a normal first contact engaging position to a second contact engaging position, the second contact of each switch being electrically connected to said first contact of the next successive switch, the first contact of each switch following the first switch being electrically connected to the control means for the saw aligned with the next preceding switch whereby the saw aligned with the switch element most remote from said base point engaged by a board is activated to operative position, and holding means on each of said electrical control means for retaining any saw so activated to operative position in such position until the switch operating element aligned with the next successive saw is engaged by a board, said holding means comprising an energizing circuit for each electrical control means including the first contact of the switch aligned with the next successive saw, said operating elements being arranged to be simultaneously engaged by an advancing board except that the operating element of the first switch is arranged to move said first switch to its second contact position after all other intercepted switches are removed from their first contact position whereby any closed energizing circuits for said holding means are opened before any saw activating circuits are established.

12. In a lumber trimming machine adapted for trimming lumber of random lengths to predetermined lengths and having a plurality of adjustably mounted driven saws having operative and inoperative positions successively spaced at said predetermined lengths from a base point, means for advancing individual pieces of lumber across said saws with one end of said pieces aligned closely adjacent said base point, and individual actuating means operatively connected to said saws for independently moving said saws from one of said positions to the other of said positions, the invention comprising individual switch means positioned before each of said saws and arranged to be actuated by a piece of lumber advancing toward the corresponding saw, means responsive to actuation of a switch means for energizing the actuating means of the saw-preceding the last saw in order from the base point reached by the other end of the piece to move said preceding saw to inoperative position if not already therein, means responsive to the most remotely actuated switch means from said base point for energizing the actuating means of the saw aligned with said remotely actuated switch means to move said last mentioned saw to operative position if not already in such position, and means for retaining said last mentioned saw in operative position until the switch means of the next succeeding saw in order from said base point is actuated.

13. In a lumber trimming machine adapted for trimming lumber of random lengths to predetermine lengths and having a plurality of adjustably mounted driven saws having operative and inoperative positions successively spaced at said predetermined lengths from a base point, means for advancing individual pieces of lumber across said saws with one end of said pieces aligned closely adjacent said base point, and individual actuating means operatively connected to said saws for independently moving said saws from one of said positions to the other of said positions, the invention comprising individual switch means positioned one before each of said saws and arranged to be actuated by a piece of lumber advancing toward the corresponding saw, means responsive to actuation of a switch means and operatively connected to the actuating means of the saw-preceding the last saw in order from the base point reached by the other end of the piece for energizing said last mentioned actuating means to move said preceding saw to inoperative position if not already therein, and means responsive to the most remotely actuated switch means from said base point and operatively connected to the actuating means of the saw aligned with said remotely actuated switch means for energizing said last mentioned actuating means to move said last mentioned saw to operative position if not already in such position.

References Cited in the file of this patent

UNITED STATES PATENTS

| | | |
|---|---|---|
| 1,279,721 | Lieber | Sept. 24, 1918 |
| 1,398,495 | Rogers et al. | Nov. 29, 1921 |
| 1,969,425 | Richardson | Aug. 7, 1934 |
| 2,016,799 | DeKoning | Oct. 8, 1935 |
| 2,091,647 | Nicholson | Aug. 31, 1937 |
| 2,332,654 | Mead et al. | Oct. 26, 1943 |
| 2,393,617 | De Spain | Jan. 29, 1946 |